United States Patent
Abd Elhamid et al.

(10) Patent No.: US 8,246,808 B2
(45) Date of Patent: Aug. 21, 2012

(54) SELECTIVE ELECTROCHEMICAL DEPOSITION OF CONDUCTIVE COATINGS ON FUEL CELL BIPOLAR PLATES

(75) Inventors: Mahmoud H. Abd Elhamid, Grosse Pointe Woods, MI (US); Gayatri Vyas Dadheech, Rochester Hills, MI (US); Youssef M. Mikhail, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 742 days.

(21) Appl. No.: 12/188,486

(22) Filed: Aug. 8, 2008

(65) Prior Publication Data

US 2010/0032306 A1 Feb. 11, 2010

(51) Int. Cl.
C25D 5/02 (2006.01)
C25D 5/06 (2006.01)
H01M 4/64 (2006.01)
H01M 2/38 (2006.01)

(52) U.S. Cl. ........ 205/122; 205/112; 205/135; 205/136; 429/457; 429/518; 427/115; 427/429

(58) Field of Classification Search .................. None
See application file for complete search history.

(56) References Cited

U.S. PATENT DOCUMENTS

| | | | |
|---|---|---|---|
| 4,997,529 A * | 3/1991 | Totsuka et al. ............. 205/135 |
| 6,372,376 B1 * | 4/2002 | Fronk et al. ................ 429/487 |
| 6,811,918 B2 | 11/2004 | Blunk et al. |
| 6,887,613 B2 | 5/2005 | Lee et al. |
| 8,148,035 B2 * | 4/2012 | Dadheech et al. ........... 429/535 |
| 2004/0191605 A1 * | 9/2004 | Kinkelaar et al. ........... 429/38 |
| 2006/0099481 A1 | 5/2006 | Ji et al. |
| 2006/0105222 A1 * | 5/2006 | Abd Elhamid et al. ...... 429/38 |
| 2006/0113192 A1 * | 6/2006 | Kurashina et al. .......... 205/83 |
| 2006/0216571 A1 | 9/2006 | Vyas et al. |
| 2007/0015036 A1 * | 1/2007 | Elhamid et al. ............. 429/38 |
| 2008/0038619 A1 * | 2/2008 | Takagi et al. ............... 429/34 |

FOREIGN PATENT DOCUMENTS

CA 2596198 A1 * 2/2008
CN 101160675 4/2008

* cited by examiner

*Primary Examiner* — Krishnan S Menon
*Assistant Examiner* — Michelle Adams
(74) *Attorney, Agent, or Firm* — BrooksGroup

(57) ABSTRACT

One exemplary embodiment includes a method of selectively electroplating an electrically conductive coating on portions of a first face of a bipolar plate for use in a proton exchange membrane (PEM) fuel cell. The first face of the bipolar plate defines at least one reactant gas flow channel and a plurality of lands adjacent the at least one channel. The electrically conductive coating may be selectively electroplated on a plurality of first portions of the lands leaving second portions of the lands uncoated by the electrically conductive coating.

19 Claims, 2 Drawing Sheets

SELECTIVE ELECTROCHEMICAL DEPOSITION OF CONDUCTIVE COATINGS ON FUEL CELL BIPOLAR PLATES

TECHNICAL FIELD

The field to which the disclosure generally relates includes bipolar plates for fuel cells and methods of making and using the same.

BACKGROUND

Heretofore bipolar plates for fuel cells have been known to include at least one reaction gas flow path defined in a surface of a bipolar plate by a plurality of lands and at least one channel. To reduce contact resistance between a diffusion media layer and a bipolar plate, the surface defining the reaction gas flow path of the bipolar plate has heretofore been coated with gold.

SUMMARY OF EXEMPLARY EMBODIMENTS OF THE INVENTION

One exemplary embodiment of the invention includes a method including providing a bipolar plate including at least one reacting gas flow path defined in a surface of the bipolar plate by a plurality of lands and at least one channel, selectively electroplating an electrically conductive coating over a plurality of first locations on the lands, and so that a plurality of second locations on the lands are free of the electrically conductive coating, and so that the channels are substantially free of the electrically conductive coating. In one exemplary embodiment the electrically conductive coating may include gold.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
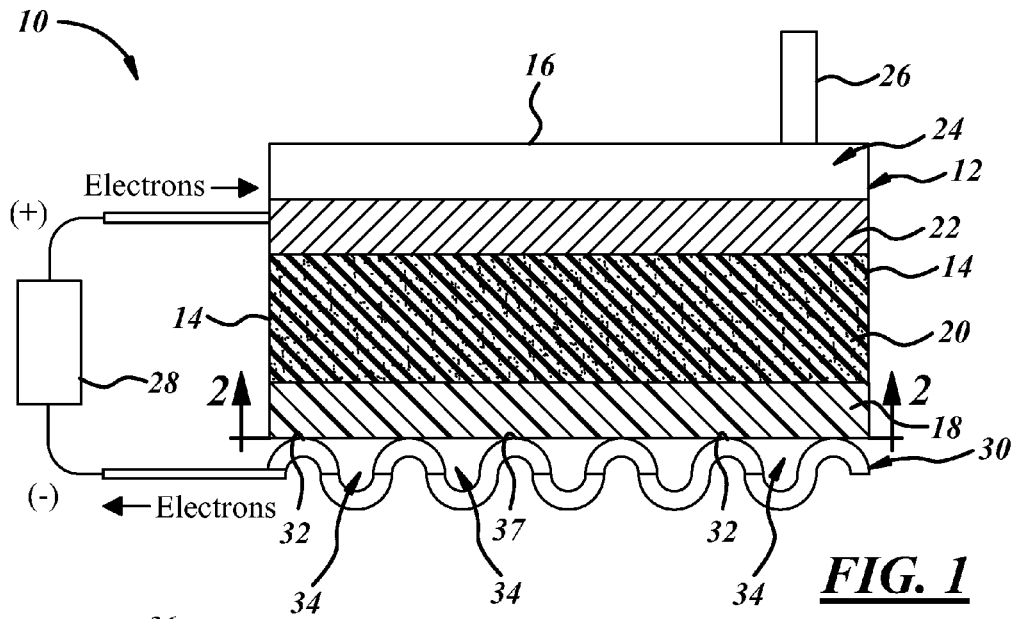
FIG. 1 illustrates an electroplating system useful in a method according to one exemplary embodiment of the invention.
Figure 2:
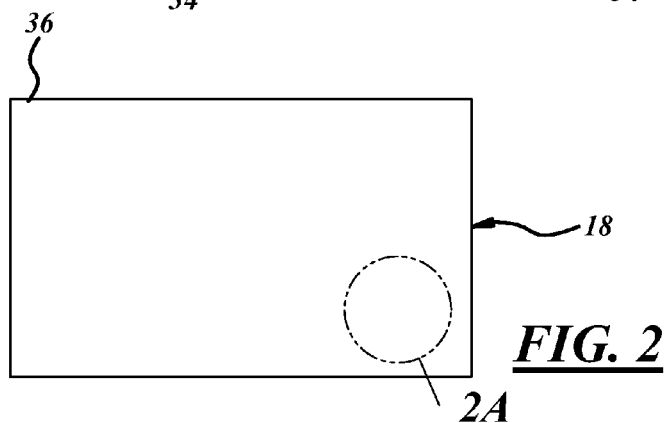
FIG. 2 is a view of the bottom of the electroplating plating system of FIG. 1 having a plurality of through-holes useful in a method according to one exemplary embodiment.
Figure 2A:
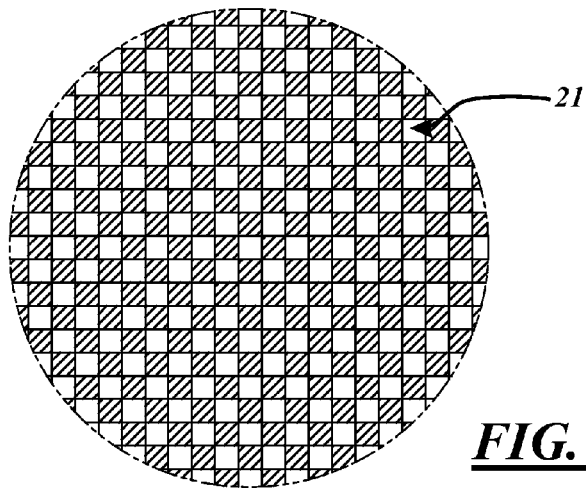
FIG. 2A is an enlarged view of a portion 2A of FIG. 2.

Referring now to FIG. 1-2A, one embodiment of the invention may include a method including providing an electroplating system 10 including a container 12 which may include sidewalls 14, a top 16 and a bottom 18 each of which may be an insulative material such as a polymeric material. The bottom 18 may be a polymeric sheet including a plurality of through-holes 21 best seen in FIG. 2A. The through-holes 21 may each be of and arranged in a variety of designs. In one embodiment, the through-hole may have a cross-sectional area ranging from 1 nm to 100 nm, and may be spaced apart a distance from center-to-center ranging from 1 nm to 100 nm. A material for slowing the flow of the electrolyte solution through the through-holes 21, such as, but not limited to, a sponge 20 may be provided in the container overlying the bottom 18. A positive electrode (anode) 22 may be provided in the container and connected to an electrical source such as a battery 28. The positive electrode 22 may be made from any of a variety of electrically conductive materials, such as but not limited to low contact resistant materials. A suitable low contact resistant material or coating may include, but is not limited to, gold, palladium, platinum, iridium, ruthenium, silver, alloys or mixtures thereof may be suitable for the positive electrode 22. An electrolytic solution 24 may be provided in the container which is complementary to the positive electrode 22. A charge pipe 26 may be provided and connected to the container 12 to replenish the electrolytic solution from a reservoir.

At least a first substrate 30 for a fuel cell bipolar plate may be positioned under the bottom 18 and connected to the electrical source (battery) 28. The first substrate 30 includes a first face 31 having a fuel cell reactant gas flow field defined therein by a plurality of lands 32 and channels 34. The first substrate 30 may also include a second opposite face 33 which may include a plurality of portions of a coolant fluid channel 40 defined therein. When the first substrate 30 and the positive electrode 22 are connected to the battery 28 electrons flow from the first substrate 30 to the positive electrode 22 and so that material from the positive electrode enters the electrolytic solution and travels through the plurality of through-holes 21 in the bottom 18 to be selectively electroplated on portions of the lands 32 of the first substrate leaving portions of the lands uncovered.

Figure 3:
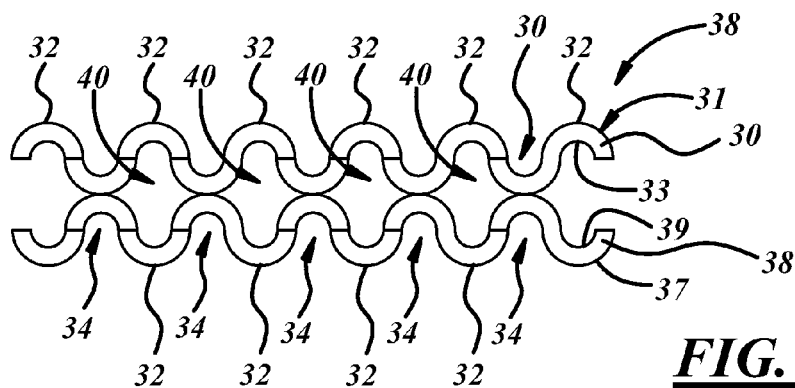
FIG. 3 is a sectional view of a bipolar plate including a first substrate and a second substrate onto which an electrically conductive coating may be selectively electroplated according to one embodiment of the invention.
Figure 4:
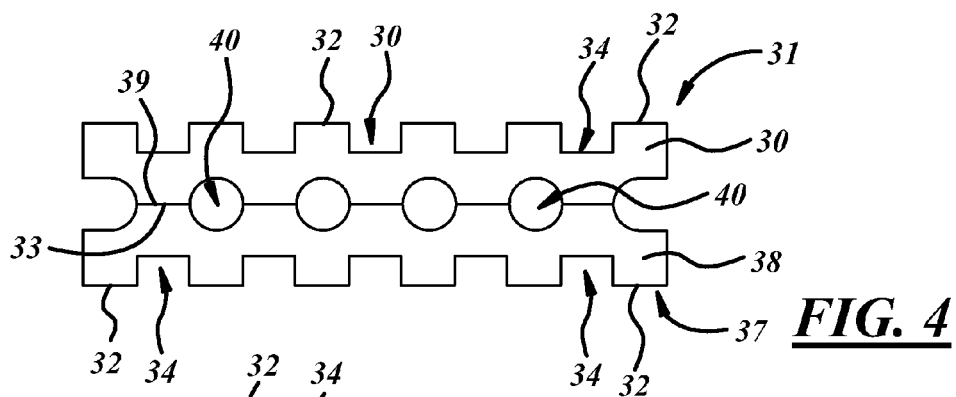
FIG. 4 illustrates an alternative embodiment of a fuel cell bipolar plate onto which an electrically conductive coating may be selectively electroplated according to one embodiment of the invention.

FIG. 3 illustrates an alternative embodiment showing a first substrate 30 including a first face 31 defining a plurality of lands 32 and channels 34. A second substrate 38 which includes a first face 37 also defining a plurality of lands 32 and channels 34 is joined to the first substrate 30. A plurality of coolant fluid flow channels 40 may be defined between the first substrate 30 and second substrate 38. The first substrate 30 may have a second face 33 which also defines a plurality of lands and channels. Likewise, the second substrate 38 may have a second face 39 defining a plurality of lands and channels. FIG. 4 illustrates an alternative embodiment of a fuel cell bipolar plate wherein the first substrate 30 and second substrate 38 may be substantially thicker.

Figure 5:
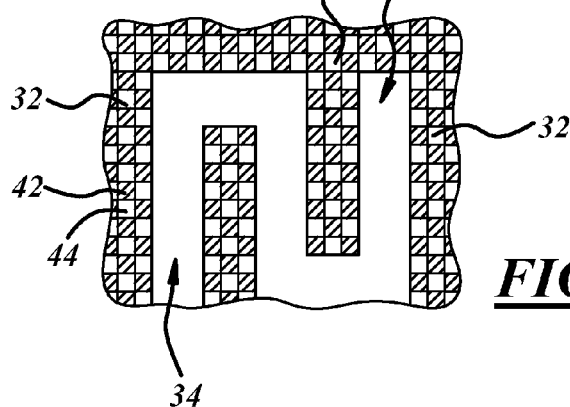
FIG. 5 is an enlarged, partial, plan view of a surface of a fuel cell bipolar plate including a plurality of lands and a reacting gas flow channel, and wherein an electrically conductive coating has been electroplated selectively on portions of the lands leaving portions of the lands uncoated, as well as the channels uncoated according to one exemplary embodiment.

FIG. 5 is an enlarged, partial, plan view of a portion of the first face 31 of a first substrate 30 of a fuel cell bipolar plate. The first face 31 includes at least one reacting gas flow channel 34 defined by a plurality of lands 32. An electrically conductive material 42 is selectively deposited over portions of the lands 32 leaving portions 44 uncovered by the electrically conductive material. Furthermore, the channels 34 may be substantially free of the electrically conductive material 42.

Figure 6:
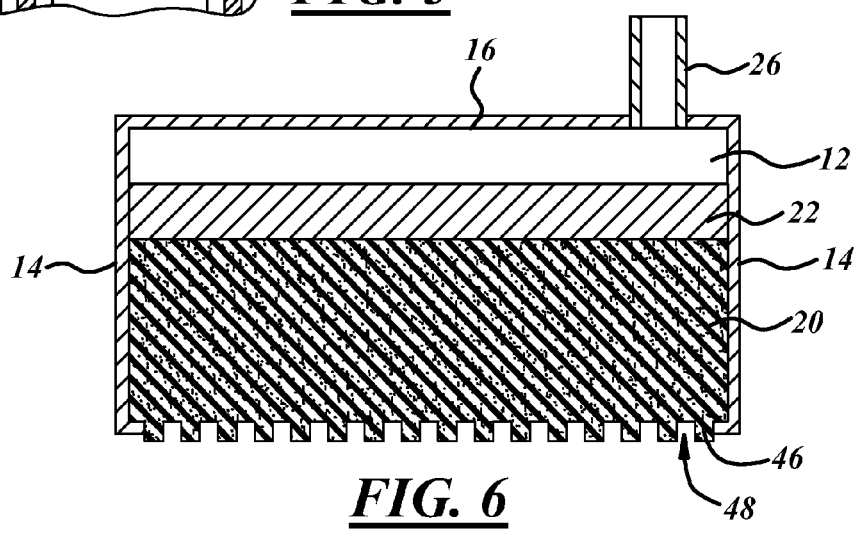
FIG. 6 illustrates an alternative method of electroplating selected portions of the lands of a fuel cell bipolar plate utilizing a sponge having a plurality of raised features or projections for contact with portions of the lands of the fuel cell bipolar plate according to one exemplary embodiment.

Referring now to FIG. 6, in another embodiment of the invention, the container 12 may be modified to remove the bottom 18 and the sponge 20 may be provided with a plurality of raised features or projections 46 extending downwardly with the adjacent projections 46 spaced apart by a recess 48 so that the projections 46 selectively contact portions of the lands 32 to electrically plate the electrically conductive material thereon.

In one embodiment electrically conductive coating is a gold alloy having up to 90 Wt % gold and the balance including an unstable metal. The unstable metal can be zinc, magnesium, aluminum or mixtures thereof. In one embodiment the alloy may include a reactive component, and the reactive component may be dissolved in an acid such as sulfuric acid or a base such as sodium or potassium hydroxide leaving behind gold islands on the lands. The above described designs may be constructed and arranged and operated so that less than 30% of the area of the lands is electroplated.

The above description of embodiments of the invention is merely exemplary in nature and, thus, variations thereof are not to be regarded as a departure from the spirit and scope of the invention.

What is claimed is:

1. A method comprising:
providing a bipolar plate having a reactant gas flow field defined in a face thereof by a plurality of lands and at least one reactant gas flow channel,
selectively electroplating an electrically conductive coating over a plurality of first portions of the plurality of lands leaving a plurality of second portions of the plurality of lands uncoated by the electrically conductive coating, wherein the at least one reactive gas flow channel is substantially free of the electrically conductive coating, and wherein the plurality of first portions and the plurality of second portions are substantially coplanar.

2. A method comprising:
providing a substrate for a fuel cell bipolar plate having a face, the first face defining at least one reactant gas flow channel and a plurality of lands adjacent to the at least one reactant gas flow channel,
selectively electroplating an electrically conductive coating on a plurality of first portions of the plurality of lands leaving a plurality of second portions of the plurality of lands uncovered by the electrically conductive coating and the at least one reactant gas flow channel being substantially free of the electrically conductive coating, the plurality of first portions of the plurality of lands and the plurality of second portions of the plurality of lands being substantially coplanar.

3. A method as set forth in claim 2 wherein the electrically conductive coating comprises at least one of gold, palladium, platinum, iridium, silver or ruthenium.

4. A method as set forth in claim 2 further comprising providing an electroplating system comprising a container, wherein a sponge, positive electrode material and an electrolyte solution are received in the container, and the electroplating system is used to selectively electroplate the electrically conductive coating on the plurality of first portions of the plurality of lands.

5. A method as set forth in claim 4 wherein the positive electrode material comprises at least one of gold, palladium, platinum, iridium, or ruthenium.

6. A method as set forth in claim 4 wherein the container includes a plurality of sidewalls and a bottom, the bottom having a plurality of through-holes formed therethrough so that the electrolyte solution travels through the bottom of the container via the through-holes and is selectively deposited on the plurality of first portions of the plurality of lands of the substrate leaving the plurality of second portions of the plurality of lands substantially free of the electrically conductive coating.

7. A method as set forth in claim 4 wherein the sponge includes a surface having a plurality of raised features, the sponge being constructed and arranged so that the raised features contact the plurality of first portions of the plurality of lands to selectively electroplate the electrically conductive coating on the plurality of first portions of the plurality of lands.

8. A method comprising:
providing a substrate for a fuel cell bipolar plate having a reactant gas flow field defined in a face thereof by a plurality of lands and at least one reactant gas flow channel, the plurality of lands being substantially coplanar,
providing an electroplating system including a container comprising a plurality of sidewalls and a bottom having a plurality of through-holes formed in a pattern therein, the container having received therein a positive electrode, electrolytic solution and a material for slowing flow of the electrolytic solution through the plurality of through-holes formed in the bottom, and
using the electroplating system to selectively electroplate an electrically conductive coating on a plurality of first portions of the plurality of lands of the substrate, leaving a plurality of second portions of the plurality of lands uncoated and leaving the at least one channel substantially free of the electrically conductive coating, wherein the plurality of second portions of the plurality of lands are contacted with the bottom of the container, and wherein the electrolytic solution flows through the through-holes formed in the bottom of the container and onto the plurality of first portions of the plurality of lands and so that the plurality of second portions of the plurality of lands are uncoated by the electrolytic solution.

9. A method as set forth in claim 8 wherein the material for slowing flow of the electrolytic solution through the plurality of through-holes formed in the bottom comprises a sponge.

10. A method as set forth in claim 9 wherein the sponge is constructed and arranged so that the plurality of first portions of the plurality of lands comprise less than 30 percent of surface area on the plurality of lands.

11. A method as set forth in claim 8 wherein the positive electrode comprises at least one of gold, palladium, platinum, iridium, or ruthenium.

12. A method as set forth in claim 8 wherein the electrically conductive coating comprises gold.

13. A method as set forth in claim 8 wherein the electrically conductive coating is a gold alloy comprising up to 90 percent, by weight, gold and the balance an unstable metal.

14. A method as set forth in claim 13 wherein the unstable metal comprises at least one of zinc, magnesium or aluminum.

15. A method as set forth in claim 14 wherein the gold alloy further comprises a reactive component, and the reactive component is dissolved in an acid or a base so that gold, islands form on the plurality of first portions of the plurality of lands.

16. A method comprising:
providing a substrate for a fuel cell bipolar plate, the substrate having a face with an undulating surface, the undulating surface defining at least one trough for reactant gas flow and a plurality of crests,
selectively electroplating an electrically conductive coating on a plurality of first portions of the plurality of crests leaving a plurality of second portions of the plurality of crests uncovered by the electrically conductive coating and so that the at least one trough is substantially free of the electrically conductive coating.

17. A method as set forth in claim 16 further comprising providing an electroplating system comprising a container, wherein a sponge, positive electrode material and an electrolyte solution are received in the container and the electroplating system is used to selectively electroplate the electrically conductive coating in a pattern on the plurality of first portions of the plurality of crests.

18. A method as set forth in claim 17 wherein the container includes a plurality of sidewalls and a bottom, the bottom having a plurality of through-holes formed therethrough so that the electrolyte solution travels through the bottom of the container via the through-holes and is selectively deposited on the plurality of first portions of the plurality of crests of the substrate leaving the plurality of second portions of the plurality of crests substantially free of the electrically conductive coating.

19. A method as set forth in claim 17 wherein the sponge includes a surface having a plurality of raised features, the plurality of raised features of the sponge being configured to contact the plurality of first portions of the plurality of crests of the substrate to selectively electroplate the electrically conductive coating on the plurality of first portions of the plurality of crests.

* * * * *